(12) United States Patent
Huang et al.

(10) Patent No.: US 8,379,342 B2
(45) Date of Patent: Feb. 19, 2013

(54) MAGNETIC RECORDING DISK DRIVE WITH ROTATIONAL VIBRATION COMPENSATION HAVING ADAPTIVE OPTIMIZATION OF VIBRATION SENSOR GAINS

(75) Inventors: Fu-Ying Huang, San Jose, CA (US); Tetsuo Semba, San Jose, CA (US); Xiaotian Sun, Saratoga, CA (US)

(73) Assignee: HGST Netherlands B.V., Amsterdam (NL)

( * ) Notice: Subject to any disclaimer, the term of this patent is extended or adjusted under 35 U.S.C. 154(b) by 1191 days.

(21) Appl. No.: 12/211,569

(22) Filed: Sep. 16, 2008

(65) Prior Publication Data
US 2010/0067357 A1    Mar. 18, 2010

(51) Int. Cl.
*G11B 21/02* (2006.01)
(52) U.S. Cl. ......................................................... 360/75
(58) Field of Classification Search ........................ None
See application file for complete search history.

(56) References Cited

U.S. PATENT DOCUMENTS

| | | | |
|---|---|---|---|
| 6,937,423 B1 * | 8/2005 | Ngo et al. | 360/77.02 |
| 6,952,318 B1 | 10/2005 | Ngo | |
| 7,035,034 B2 | 4/2006 | Semba et al. | |
| 7,375,916 B2 * | 5/2008 | Semba et al. | 360/77.04 |
| 7,580,217 B2 * | 8/2009 | Abe et al. | 360/77.02 |
| 7,595,953 B1 * | 9/2009 | Cerda et al. | 360/77.04 |

\* cited by examiner

*Primary Examiner* — K. Wong
(74) *Attorney, Agent, or Firm* — Thomas R. Berthold

(57) ABSTRACT

A disk drive and a method for operating the disk drive compensates for rotational vibration (RV) by adaptively modifying the gains of two separate linear vibration sensors so the sensor gains are optimal under any given condition. The two sensors provide two signals S1, S2, respectively, to the disk drive's servo control processor that generates the control signal to the voice coil motor (VCM) actuator that controls the positioning of the read/write head. The processor uses S1, S2 and the head position error signal (PES) as inputs to run an adaptive RV feedforward (RVFF) algorithm. The adaptive RVFF algorithm takes the PES and sensor outputs S1 and S2 as inputs, mathematically determines the required correction to the sensor gain factors k1 and k2, respectively, and then adjusts the gain factors k1 and k2 accordingly. Each signal S1, S2 is then modified by its adjusted gain factor k1, k2, respectively. The difference in the modified S1, S2 signals is the RVFF signal that is summed with the control signal to generate the RV-compensated control signal to the VCM actuator.

12 Claims, 3 Drawing Sheets

MAGNETIC RECORDING DISK DRIVE WITH ROTATIONAL VIBRATION COMPENSATION HAVING ADAPTIVE OPTIMIZATION OF VIBRATION SENSOR GAINS

BACKGROUND OF THE INVENTION

1. Field of the Invention

This invention relates generally to magnetic recording disk drives, and more particularly to a disk drive that includes a system for canceling the effects of rotational vibration.

2. Description of the Related Art

Magnetic recording hard disk drives use an actuator, typically a rotary voice-coil-motor (VCM) actuator, for positioning the read/write heads on the data tracks of the recording disks. The disk drive has a servo control system that receives a position error signal (PES) from servo positioning information read by the heads from the data tracks and generates a VCM control signal to maintain the heads on track and move them to the desired track for reading and writing of data.

Disk drives experience rotational vibration and disturbance forces during normal operation. These disturbances arise internally, such as from motion of the VCM actuator, as well as externally, such as from shocks to the frame supporting the disk drive or from the movement of other disk drives when the drives are mounted together in a disk array system.

Rotational vibration (RV) cancellation is a method that uses sensors to detect rotational vibration and improve the PES by canceling the off-track motion induced by the rotational vibration. One approach uses two linear accelerometers or vibration sensors, typically mounted on the disk drive's printed circuit board, to measure the RV. The measured RV is input to a feedforward controller that creates a feedforward compensation signal that is summed with the control signal to the VCM actuator. This method is sometimes called RV feedforward (RVFF). For RVFF to function effectively and not create an undesirable compensation signal that degrades the PES, the two linear vibration sensors should have minimal gain mismatch, i.e., minimal mismatch in their primary-axis sensitivities and minimal off-axis sensitivities, in addition to minimal mismatch in their orientations on the circuit board. In addition, it is also required that the circuit board have sufficiently high rigidity and damping so there is no significant standing or propagating waves on the circuit board to cause false sensor output (noise) that is not related to the RV. Thus the manufacturing cost of the disk drive and the component costs of the linear vibration sensors and circuit board can be significantly increased if it is desired to use RVFF without also degrading the PES and thus the performance of the disk drive.

U.S. Pat. No. 6,952,318 B1 describes an RVFF method that addresses mismatch in primary-axis sensitivities of the two linear vibration sensors by converting the two sensor outputs into separate digital signals and scaling them. The method requires inducing self-generated vibration in the disk drive and then comparing the magnitude of the two sensor outputs to reduce the difference in the gains of the two sensors. However, self-generated vibration in disk drives is normally not pure linear vibration but contains a significant amount of RV. Depending on the center of the RV, it is normally expected that the magnitudes of the two sensor outputs would be different, even with exactly matched primary-axis sensitivities. Also, this RVFF method does not address the problem of noise caused by off-axis sensitivity and circuit board vibration.

U.S. Pat. No. 7,035,034 B2 describes an RVFF method to determine the optimal gains for the two linear vibration sensors by first disabling RVFF and then collecting data and calculating the optimal gains, which then become fixed values for use in the RVFF.

What is needed is a disk drive with an effective RVFF method that does not require linear vibration sensors with exactly matched gains or a circuit board with special rigidity and damping characteristics, wherein the sensor gains are adaptive so as to be optimal under any given condition during operation of the disk drive.

SUMMARY OF THE INVENTION

The invention relates to a disk drive and a method for operating the disk drive that compensates for rotational vibration (RV) by adaptively modifying the gains of two separate vibration sensors so the sensor gains are optimal under any given condition. The disk drive includes two linear accelerometers that provide two signals S1, S2, respectively, to the disk drive's servo control processor. The processor uses S1, S2 and the position error signal (PES) as inputs to run an adaptive RV feedforward (RVFF) algorithm. The adaptive RVFF algorithm takes the PES and sensor outputs S1 and S2 as inputs, mathematically determines the required correction to the sensor gain factors k1 and k2, respectively, and then adjusts the gain factors k1 and k2 accordingly. Each signal S1, S2 is then modified by its adjusted gain factor k1, k2, respectively. The difference in the modified S1, S2 signals is the RVFF signal that is summed with the control signal to generate the RV-compensated control signal to the VCM actuator. The method continues, with continual updating of k1 and k2, until optimal values of k1, k2 are achieved.

The method for adaptively modifying the gain factors to arrive at the optimal gain factor values is preferably implemented in the disk drive during normal operation whenever RVFF is operational, i.e., when the disk drive is idling with the head maintained on a data track (track following) or when the head is reading or writing data on a data track. The method may also be implemented as part of the disk drive manufacturing process, or during the disk drive error recovery procedure for recovering from read or write errors.

For a fuller understanding of the nature and advantages of the present invention, reference should be made to the following detailed description taken together with the accompanying figures.

DETAILED DESCRIPTION OF THE INVENTION

Figure 1:
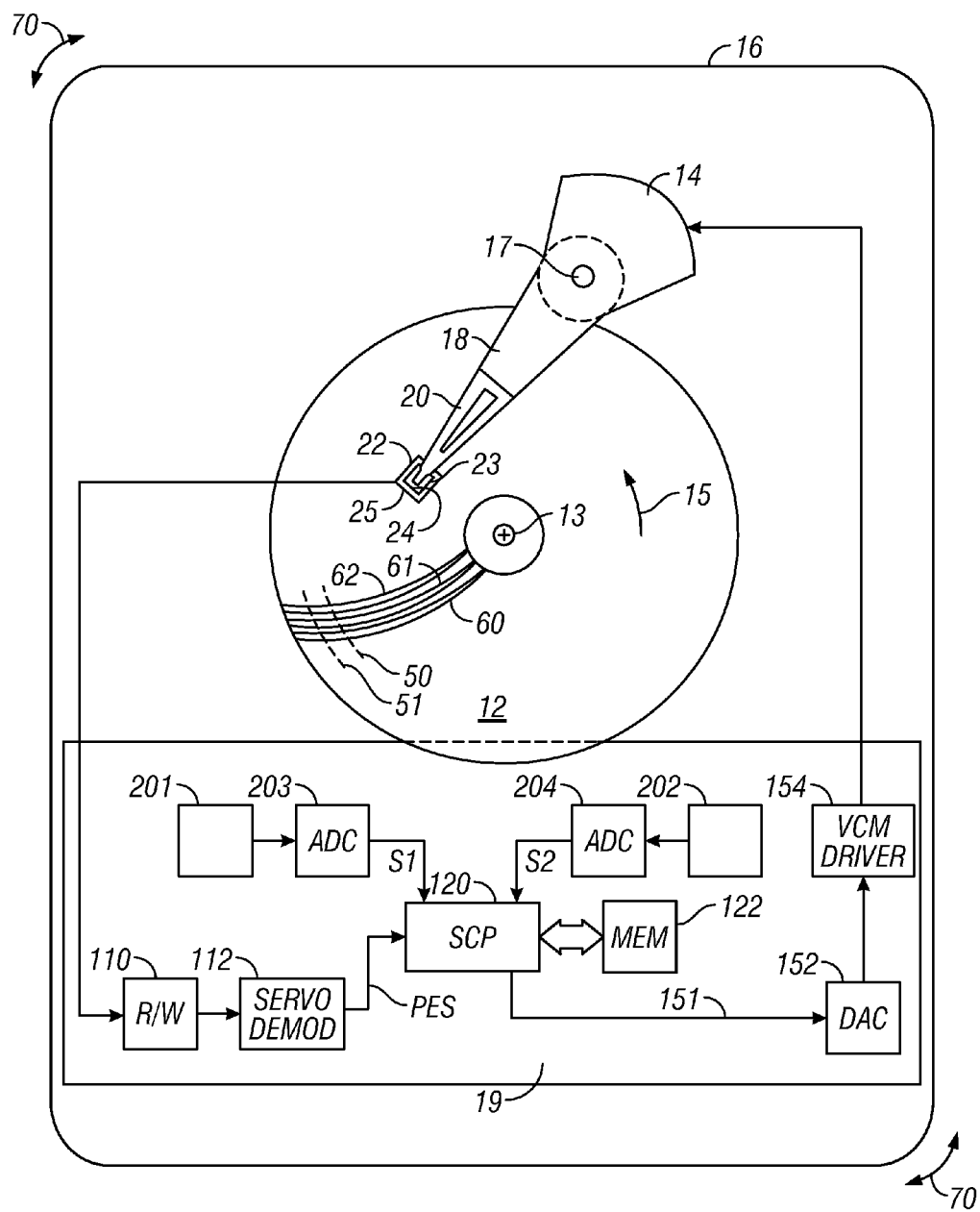
FIG. 1 is a schematic top view of a magnetic recording hard disk drive with two linear vibration sensors and rotational vibration feedforward (RVFF) according to the invention.

FIG. 1 is a block diagram of a magnetic recording hard disk drive according to the invention. The disk drive includes a magnetic recording disk 12 that is rotated about an axis of rotation 13 in direction 15 by a spindle motor (not shown) mounted to the disk drive housing or base 16. A printed circuit board 19 is attached to housing 16 and supports the disk drive electronics. The disk 12 has a magnetic recording layer patterned into magnetizable blocks that define concentric data tracks, such as typical tracks 50, 51, and servo sectors, such as typical servo sectors 60, 61, 62. The servo sectors extend generally radially across the concentric data tracks so that each data track has a plurality of equally-angularly spaced servo sectors that extend around the track. Each of the servo sectors in a data track typically contains a servo timing mark (STM) that indicates the start of the servo sector, a track identification (TID) code, and a portion of a pattern of magnetized blocks or high-frequency bursts that are decoded or demodulated to provide a head position error signal (PES).

The disk drive also includes a rotary voice coil motor (VCM) actuator 14 supported on the base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write (R/W) head 24 is formed on the trailing surface 25 of slider 22. The flexure 23 and suspension 20 enable the slider to "pitch" and "roll" on an air-bearing generated by the rotating disk 12.

As the disk 12 rotates in the direction 15, the positioning information in the servo sectors is read by the read head and sent to R/W electronics 110. The servo pattern demodulator 112 receives input from R/W electronics 110 and demodulates the positioning information in the servo sectors to provide a digital signal that is compared with a position reference to generate the PES to the servo control processor (SCP) 120. The SCP 120 may be a dedicated processor or other microprocessor and is coupled to associated memory 122.

The servo control processor 120 uses the PES as input to a control algorithm to generate a control signal for the VCM 14. The control algorithm recalls from memory 122 a "controller", which is a set of parameters based on the static and dynamic characteristics of the "plant" being controlled, i.e., the VCM 14. The control algorithm is essentially a matrix multiplication algorithm, and the controller parameters are coefficients used in the multiplication and stored in memory 122 accessible by the processor 120.

The disk drive is subject to rotational disturbances, as shown by arrows 70, that arise both internally, such as from motion of the VCM 14, and externally, such as from shocks to the frame supporting the disk drive or from the movement of other disk drives when the drives are mounted together in a disk array system. These disturbances cause track misregistration (TMR) of the read/write heads. Thus it is known to incorporate into the disk drive a rotational vibration (RV) sensor for detecting rotational disturbances. The RV sensor is preferably two linear accelerometers or vibration sensors 201, 202, each attached to a respective side of printed circuit board 19. The linear vibration sensors 201, 202 are typically commercially available piezoelectric accelerometers, such as Murata Model PKGS-00LD accelerometers. The accelerometers are typically attached to the printed circuit board 19 but may also be attached to other portions of the base 16.

The outputs of the linear accelerometer 201, 202 are digitized by analog-to-digital converters (ADCs) 203, 204, respectively, which provide digital sensor signals S1, S2, respectively, to servo control processor 120. While not shown in FIG. 1, the outputs of the linear accelerometers 201, 202 may be passed through suitable filters for noise removal and phase adjustment. The servo control processor 120 uses the signals S1, S2 to calculate an RV feedforward (RVFF) signal which is used to modify the control signal calculated by the control algorithm. The SCP 120 thus provides a modified or digital RV-compensated control signal 151 to digital-to-analog converter (DAC) 152. The output of DAC 152 controls VCM driver 154, which controls the current to the VCM 14 to move the read/write head 24 to the desired data track and maintain it on track for reading and writing of data.

In this invention the processor 120 uses the PES to adaptively optimize gain factors for S1, S2 as part of the calculation of the RVFF signal. In the preferred embodiment, as depicted in FIG. 1, the RVFF signal is calculated by the processor 120 using parameters and an adaptive RVFF algorithm (also called an RVFF controller) that includes program instructions stored in memory 122. However, it is also well-known in the art that the RVFF controller may be implemented with analog circuitry that converts the signals from the sensors 201, 202 to the RVFF signal, with the RVFF signal then being summed with the control signal 150 after the servo control processor 120 has calculated the control signal 150.

Figure 2:
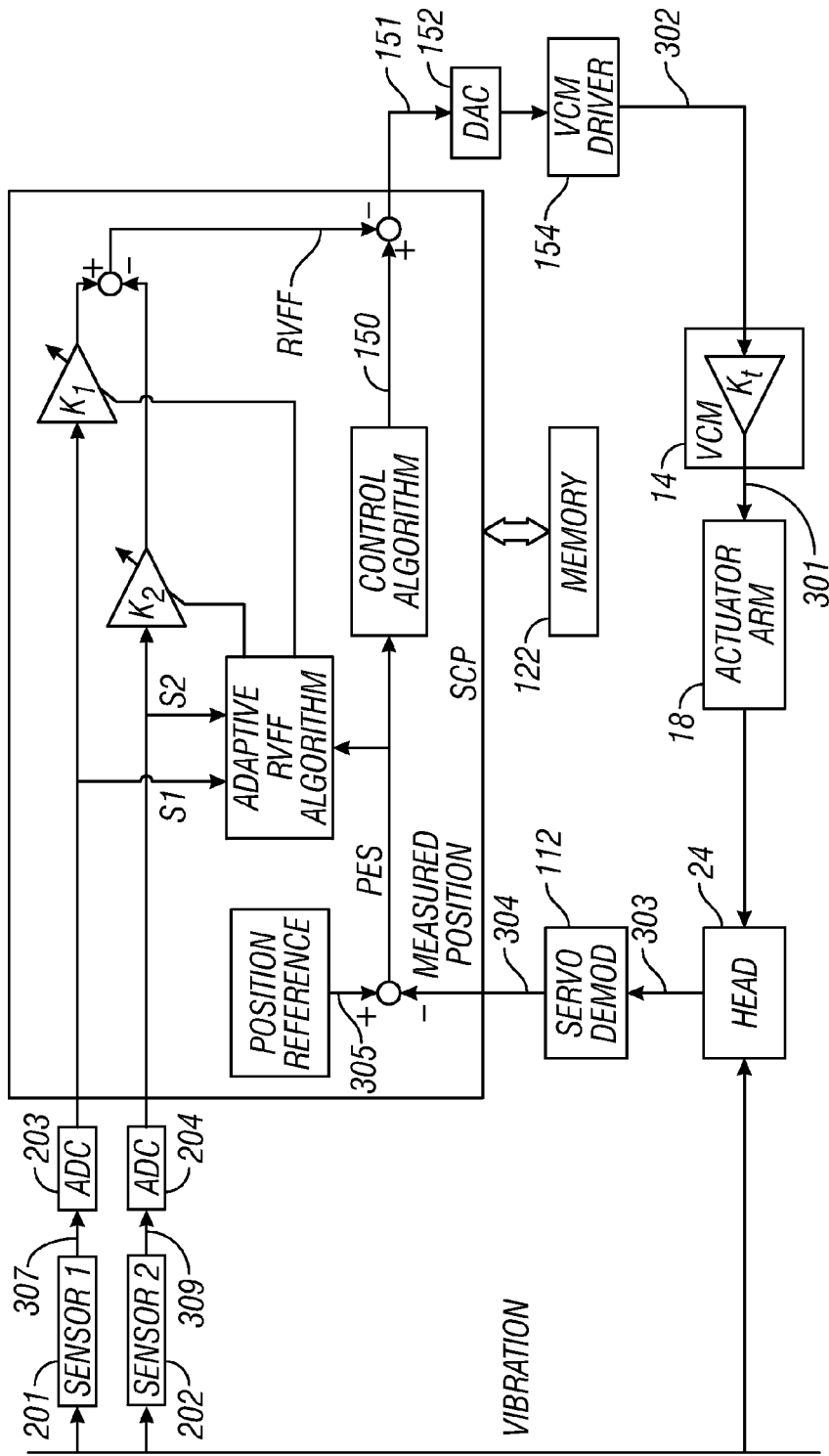
FIG. 2 is a block diagram of the sampled servo control system of the disk drive shown in FIG. 1 for illustrating the RVFF method according to the invention.

FIG. 2 is a block diagram of the sampled servo control system of the disk drive shown in FIG. 1. As shown in FIG. 2, VCM 14 is characterized by a torque output parameter 301. The servo control system includes DAC 152 that receives the modified control signal 151 and VCM driver 154 that provides an operating current 302 to VCM 14 based on the modified control signal 151 for causing the actuator arm 18 to carry the head 24 across the surface of the disk. The position of head 24, indicated by head location signal 303, is concurrently monitored by servo pattern demodulator 112 which outputs a digital signal 304, corresponding to the head location signal 303. The digital signal 304 corresponds to an indicated track position and off-track percentage value. The digital signal 304 is then combined with a signal corresponding to a position reference 305 to generate a position error signal (PES) that is received by the processor 120. The processor 120 uses the PES to run a control algorithm to generate a control signal 150.

The disk drive also includes two linear accelerometers 201, 202 that provide analog signals 307, 309, respectively, to analog-to-digital converters (ADCs) 203, 204, respectively, which provide digital sensor signals S1, S2, respectively, to servo control processor 120. As shown in FIG. 2, the sensor signals 307, 309 are generated in response to a vibration disturbance that also affects head 24. The processor 120 uses S1, S2 and the PES to run the adaptive RVFF algorithm. The adaptive RVFF algorithm takes the PES and sensor outputs S1 and S2 as inputs, mathematically determines the required correction to the gain factors k1 and k2, and then adjusts the gain factors k1 and k2 accordingly. This results in S1, S2 being modified by adaptive gain factors, k1, k2, respectively. The difference in the modified S1, S2 signals is the RVFF signal that is summed with control signal 150 to generate the RV-compensated control signal 151.

The digital signals S1, S2 are modified by the adaptive RVFF algorithm in the following manner. S1, S2 can be represented by equations (1) and (2) below:

$$S1 = g1(LV + \alpha 1 * RV + n1) \quad \text{Eq. (1)}$$

$$S2 = g2(LV - \alpha 2 * RV + n2) \quad \text{Eq. (2)}$$

where g1, g2 are the sensor gains, LV is the linear vibration, RV is the rotational vibration, n1 and n2 represent noise, and $\alpha 1$, $\alpha 2$ are magnitudes of the RV signals, relative to the LV signals, in the sensor outputs S1 and S2, respectively. The values of $\alpha 1$ and $\alpha 2$ depend on the particular sensor configuration and the characteristics of the particular combination of LV and RV that the disk drive is subject to during operation. S1, S2 are modified by adaptive gain factors k1, k2 and the difference between the modified S1 and S2 is the RVFF signal, as given by Eq. (3):

$$RVFF = k1 * S1 - k2 * S2 \quad \text{Eq. (3)}$$

If it is assumed that all of the PES is due to RV, then the RVFF signal will cause the PES to be reduced, as represented by Eq. (4):

$$PES=RV-RVFF=RV-[k1*S1-k2*S2] \qquad \text{Eq. (4)}$$

The adaptive RVFF algorithm minimizes the PES by scaling or adjusting the gain factors k1, k2. The time-derivative of Eq. (4) can be represented by Eq. (5):

$$(d/dt)PES=-S1*[(d/dt)k1]+S2*[(d/dt)k2] \qquad \text{Eq. (5)}$$

By letting $$(d/dt)k1=\gamma*S1*PES \qquad \text{Eq. (6)}$$

and $$(d/dt)k2=-\gamma*S2*PES \qquad \text{Eq. (7)}$$

where γ is a tuning parameter that allows for adjustment of the adaptation speed and accuracy, then Eq. (5) becomes:

$$(d/dt)PES=-\gamma*[(S1)^2+(S2)^2]*PES \qquad \text{Eq. (8)}$$

The term γ is a positive tuning parameter that determines the adaptation speed and precision. In general, the larger the value of γ, the faster the adaptation speed, but the resulting gain factor k1 or k2 is less precise. The value of γ is thus "tuned" to balance the need for speed and precision. It can be shown that the time derivative of the squared PES is always a negative value. Therefore, the magnitude of the PES in Eq. (8) converges to the minimum.

Thus in this invention, the RVFF signal is calculated according to equation (9)

$$RVFF(m)=k1(m)*S1(m)-k2(m)*S2(m) \qquad \text{Eq. (9)}$$

where m represents the digital sample and Eq. (9) is the digital sampling equivalent of Eq. (3). The digital values of gain factors k1, k2 are then recalculated for each digital sample of S1, S2 and PES according to the following equations (10) and (11), which are the digital sampling equivalents of equations (6) and (7), respectively, where $T_S$ is the sampling time:

$$k1(m+1)-k1(m)=\gamma*S1(m+1)*PES(m+1)*T_S \qquad \text{Eq. (10)}$$

$$k2(m+1)-k2(m)=-\gamma*S2(m+1)*PES(m+1)*T_S \qquad \text{Eq. (11)}$$

The operation of the disk drive with adaptive RVFF according to the method of this invention will now be explained with reference to the above equations and FIG. 2. At the start of operation the values of k1 and k2 are set to an initial predetermined value. The initial values of k1 and k2 theoretically can be anything, but "1" is a good initial value. The linear vibration sensor outputs are digitized and input to the processor 120 as S1 and S2. The values of S1, S2 are multiplied by k1, k2 respectively, and the RVFF value is calculated according to Eq. (9). The RVFF is then summed with the control signal 150. The resulting PES is then measured, which can be considered PES(m+1). Then, the next samples S1(m+1), S2(m+1) are multiplied by the tuning parameter γ and PES (m+1) to calculate the right hand sides of equations (10) and (11). This allows the recalculation of k1, k2 to generate the updated k1, k2 values according to equations (10) and (11). The method then continues, with continual updating of k1 and k2 until optimal values of k1, k2 are achieved. The updating of k1 and k2 may optionally be terminated, with the RVFF continuing with the optimal values, or the k1, k2 recalculations may continue as long as the RVFF is operating. Termination of the k1, k2 updating may be set to occur, for example, whenever the amount of adjustment or change in either or both of the k1, k2 becomes less than some predetermined threshold. Also, the updating of k1 and k2 may be terminated when the actuator is moving the head from one track to another track (track seeking).

Figure 3:
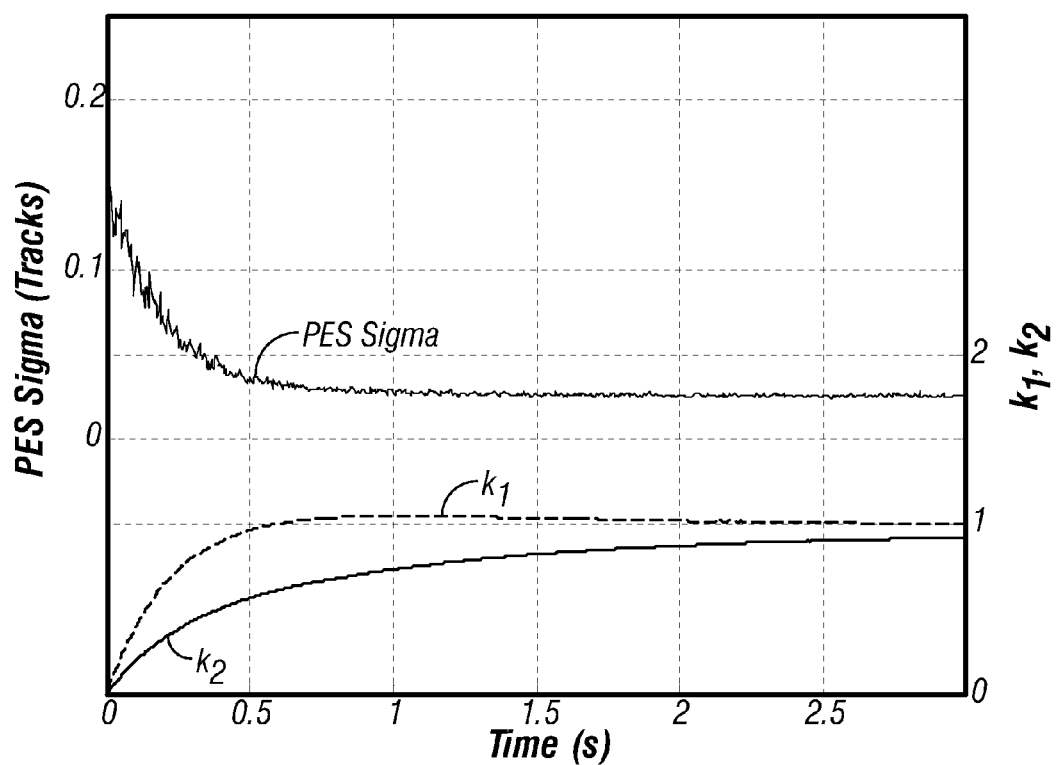
FIG. 3 is a graph of PES sigma and gain factor values applied to the linear vibration sensor signals as a function of time during the RVFF method of the invention.

FIG. 3 is a graph of an experimental result showing the standard deviation of the PES (PES sigma) and gain factor k1, k2 values as a function of time during operation of the adaptive RFFF algorithm according to the invention. The initial values of k1, k2 were set to near 0, but rapidly converge to 1. The PES is at a relatively high values of about 0.15 tracks due to RV. However the RV is rapidly compensated and the PES moves to a stable value of about 0.03 tracks as k1, k2 converge to their optimal values.

The method of the invention does not require that the linear accelerometers have exactly matched primary-axis sensitivities, therefore saving component and manufacturing cost. Also, because the gain factors are adaptively modified, the method rapidly compensates for changing conditions, such as noise caused by off-axis sensitivity and circuit board vibrations, and other effects that are not rotational vibration, such as mismatch of the orientation of the sensors on the printed circuit board.

The method of the invention for adaptively modifying the gain factors to arrive at the optimal gain factor values is preferably implemented in the disk drive during normal operation whenever RVFF is operational, i.e., when the disk drive is idling with the head maintained on a data track (track following) or when the head is reading or writing data on a data track. However, the method may also be implemented as part of the disk drive manufacturing process, or during the disk drive error recovery procedure for recovering from read or write errors.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for compensating for rotational vibration (RV) during operation of a disk drive, the disk drive including a rotatable magnetic recording disk having a plurality of concentric data tracks containing servo positioning information; a recording head movable across the disk, the head being capable of reading data and servo positioning information in the data tracks; a voice-coil-motor (VCM) for moving the head; first and second linear vibration sensors; and a servo control processor responsive to a position error signal (PES) from the servo positioning information for generating a VCM control signal; the processor-implemented method comprising:

applying a first gain factor to the signal from the first sensor to obtain a scaled first sensor signal;
applying a second gain factor to the signal from the second sensor to obtain a scaled second sensor signal;
generating a RV signal from the difference in the scaled first and second sensor signals;
applying the RV signal to the VCM control signal;
measuring the PES after the RV signal has been applied to the VCM control signal; and
adjusting the first and second gain factors in response to the measured PES.

2. The method of claim 1 wherein adjusting the first gain factor comprises multiplying the signal from the first sensor by the measured PES and subtracting the resulting product from the first gain factor, and wherein adjusting the second gain factor comprises multiplying the signal from the second sensor by the measured PES and subtracting the resulting product from the second gain factor.

3. The method of claim 2 further comprising multiplying the signal from the first sensor by a tuning parameter, and multiplying the signal from the first second sensor by said tuning parameter.

4. The method of claim 1 wherein the disk drive includes a printed circuit board and wherein the first and second linear vibration sensors are mounted on the printed circuit board.

5. The method of claim 1 further comprising terminating the adjustment of the gain factors when the amount of adjustment of at least one of the gain factors is less than a predetermined threshold value.

6. The method of claim 1 further comprising terminating the adjustment of the gain factors when the VCM is moving the head from one data track to another data track.

7. The method of claim 1 further comprising initiating the method for compensating for RV when the head is not reading or writing data.

8. The method of claim 1 further comprising initiating the method for compensating for RV in response to a signal indicating that the data read or written by the head is in error.

9. A magnetic recording disk drive including a rotatable magnetic recording disk having a plurality of concentric data tracks containing servo positioning information; a recording head movable across the disk, the head being capable of reading, in the data tracks, data and servo positioning information for providing a head position error signal (PES); a voice-coil-motor (VCM) for moving the head; first and second linear vibration sensors; a processor; non-transitory memory associated with the processor; and a program of instructions stored in memory and readable by the processor for undertaking method acts comprising:

(a) receiving a digitized signal S1 from the first linear vibration sensor and a digitized signal S2 from the second linear vibration sensor;

(b) multiplying S1 by a first gain factor k1 and S2 by a second gain factor k2;

(c) calculating a rotational vibration feedforward (RVFF) signal representing the difference between k1*S1 and k2*S2;

(d) calculating a VCM control signal from the PES;

(e) modifying the VCM control signal with the RVFF signal;

(f) receiving a PES from the servo positioning information in response to application of the modified VCM control signal to the VCM;

(g) recalculating the first and second gain factors k1 and k2 using the PES; and (h) repeating steps (a) through (g) using the re-calculated k1 and k2 in step (b).

10. The disk drive of claim 9 wherein the program of instructions for undertaking the act of recalculating the first gain factor k1 comprises instructions for multiplying S1 by the measured PES and subtracting the resulting product from the first gain factor k1, and wherein the program of instructions for undertaking the act of recalculating the second gain factor k2 comprises instructions for multiplying S2 by the PES and subtracting the resulting product from the second gain factor k2.

11. The disk drive of claim 10 wherein the program of instructions for undertaking the act of recalculating the first gain factor k1 comprises instructions for multiplying S1 by a tuning parameter, and wherein the program of instructions for undertaking the act of recalculating the second gain factor k2 comprises instructions for multiplying S2 by said tuning parameter.

12. The disk drive of claim 9 wherein the disk drive includes a printed circuit board and wherein the first and second linear vibration sensors are mounted on the printed circuit board.

* * * * *